(12) United States Patent
Simmons

(10) Patent No.: US 11,998,866 B2
(45) Date of Patent: Jun. 4, 2024

(54) TRACK AND FASTENER ASSEMBLY, KIT AND METHOD FOR SECURING A FILTER SCREEN OR COVERING TO AN AIR INTAKE FACE

(71) Applicant: The Newway Company, West Chester, OH (US)

(72) Inventor: Randy Simmons, West Chester, OH (US)

(73) Assignee: The Newway Company, West Chester, OH (US)

( * ) Notice: Subject to any disclaimer, the term of this patent is extended or adjusted under 35 U.S.C. 154(b) by 375 days.

(21) Appl. No.: 17/529,756

(22) Filed: Nov. 18, 2021

(65) Prior Publication Data

US 2022/0339569 A1    Oct. 27, 2022

Related U.S. Application Data

(60) Provisional application No. 63/178,075, filed on Apr. 22, 2021.

(51) Int. Cl.
*B01D 46/00* (2022.01)
*B01D 46/10* (2006.01)
*B01D 46/62* (2022.01)

(52) U.S. Cl.
CPC ......... *B01D 46/0005* (2013.01); *B01D 46/10* (2013.01); *B01D 46/645* (2022.01); *B01D 2265/02* (2013.01)

(58) Field of Classification Search
CPC .. B01D 46/0005; B01D 46/10; B01D 46/645; B01D 2265/02; F24F 13/084; F16B 11/006; F16M 13/02

USPC ........... 55/483, 491, 497, 501, 511, DIG. 31
See application file for complete search history.

(56) References Cited

U.S. PATENT DOCUMENTS

| | | | | |
|---|---|---|---|---|
| 5,421,862 A | * | 6/1995 | Davis | B01D 46/88 55/491 |
| 6,007,596 A | * | 12/1999 | Rosen | B01D 46/0002 55/491 |
| 7,387,654 B1 | * | 6/2008 | Byers | B01D 46/10 55/501 |
| 9,561,456 B2 | * | 2/2017 | Simmons | B01D 46/0005 |
| 9,827,521 B2 | * | 11/2017 | Simmons | E06B 9/24 |
| 9,827,522 B2 | * | 11/2017 | Simmons | F16B 11/006 |

(Continued)

OTHER PUBLICATIONS

Deltrian Nederland BV, Pro Safe Screen, Feb. 8, 2021.

(Continued)

*Primary Examiner* — Minh Chau T Pham
(74) *Attorney, Agent, or Firm* — Dinsmore & Shohl LLP

(57) ABSTRACT

A kit and assembly for securing any filter, screen or covering to a perimeter intake face surrounding an opening. The kit and assembly includes a series of tracks adapted to mount against the intake face in surrounding fashion around the opening. A plurality of fasteners are slidably installed upon each of the tracks prior to inter-assembly. The tracks further include opposite exterior rail locations which oppose tabs configured into interior facing locations of the fasteners so that the fasteners are adjustable along the tracks. The filter, screen or covering further includes a plurality of perimeter spaced apertures for securing to engaging portions of the fasteners and in order to mount the filter, screen or covering to the intake face.

19 Claims, 11 Drawing Sheets

(56) References Cited

U.S. PATENT DOCUMENTS

| | | | |
|---|---|---|---|
| 10,040,149 B2 * | 8/2018 | Simmons | F24F 13/084 |
| 11,648,498 B2 * | 5/2023 | Bland | B01D 46/0002 |
| | | | 55/483 |
| 2007/0101666 A1 | 5/2007 | Munch | |
| 2007/0204575 A1 | 9/2007 | Lisbona | |
| 2010/0146881 A1 | 6/2010 | Framer et al. | |
| 2010/0146918 A1 * | 6/2010 | Brosh | B01D 46/10 |
| | | | 55/385.4 |
| 2013/0340400 A1 * | 12/2013 | Minaeeghainipour | |
| | | | B01D 46/10 |
| | | | 55/511 |
| 2015/0375152 A1 * | 12/2015 | Simmons | F16M 13/02 |
| | | | 55/491 |
| 2018/0021716 A1 * | 1/2018 | Li | B01D 46/103 |
| | | | 55/497 |

OTHER PUBLICATIONS

International Search and Written Opinion, dated Mar. 15, 2022 for PCT Application No. PCT/US2021/060538 filed Nov. 23, 2021 entitled "Track and Fastener Assembly, Kit and Method for Securing a Filter Screen or Covering to an Air Intake Face" (10 pages).

* cited by examiner

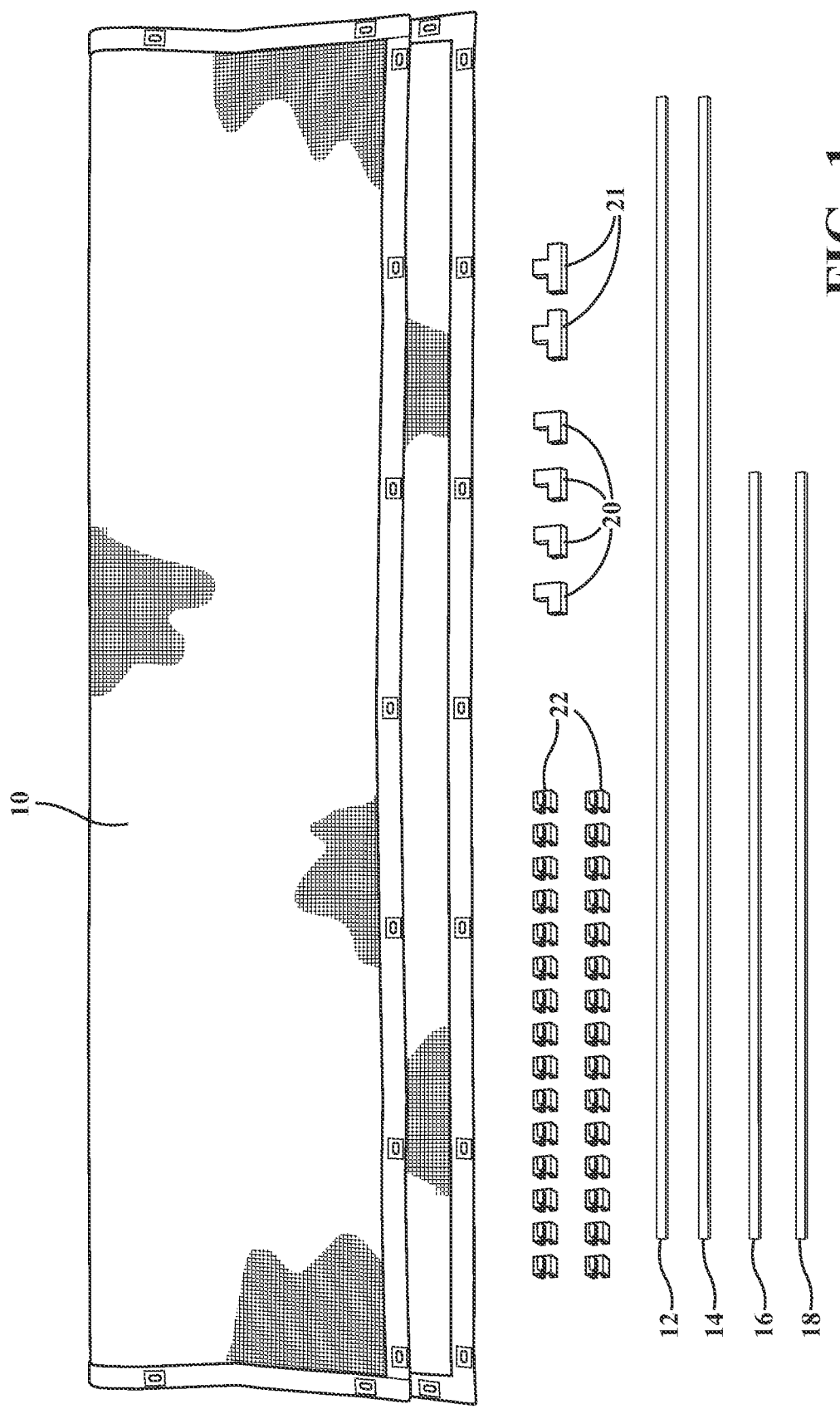

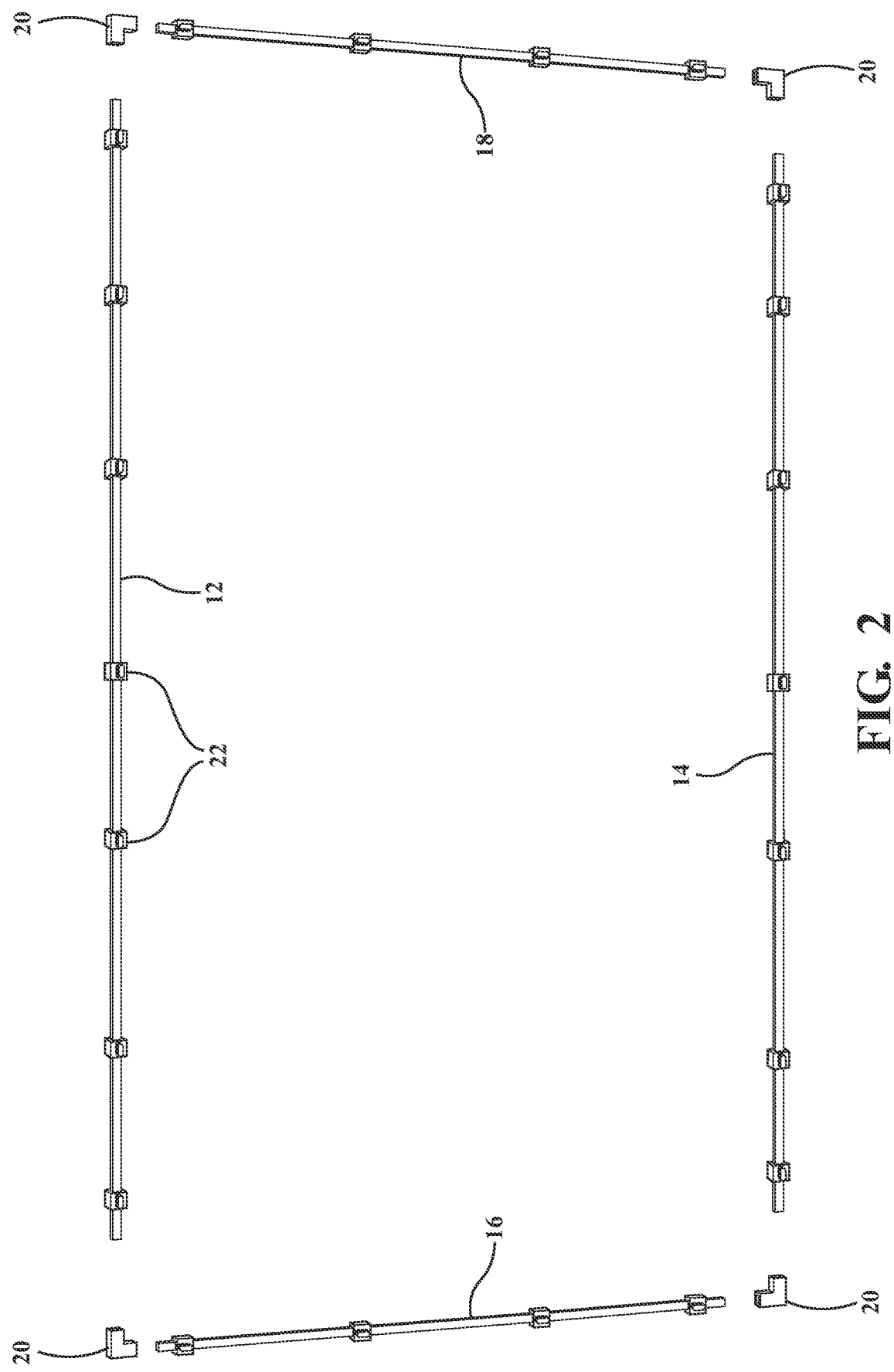

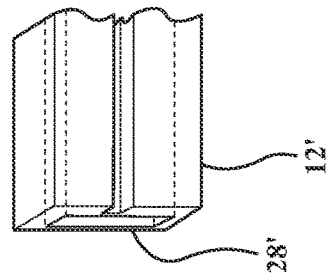
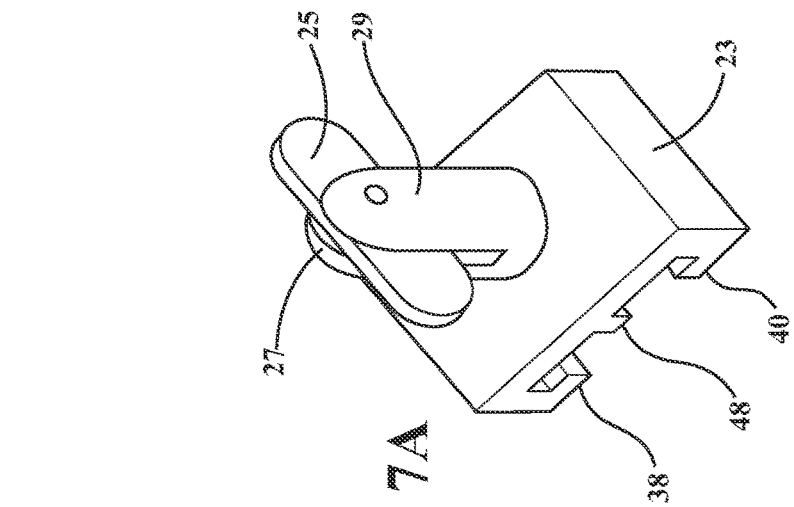
FIG. 7A
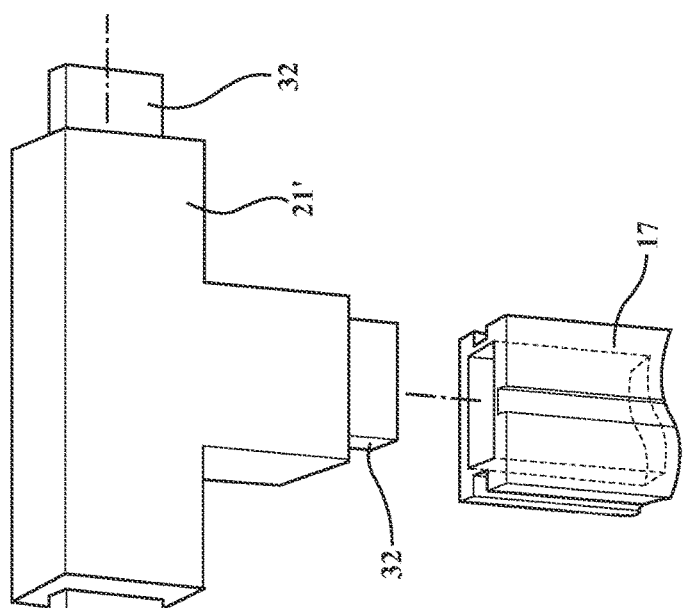
FIG. 6B
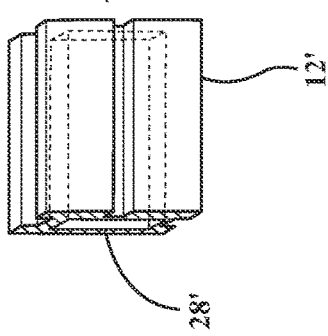
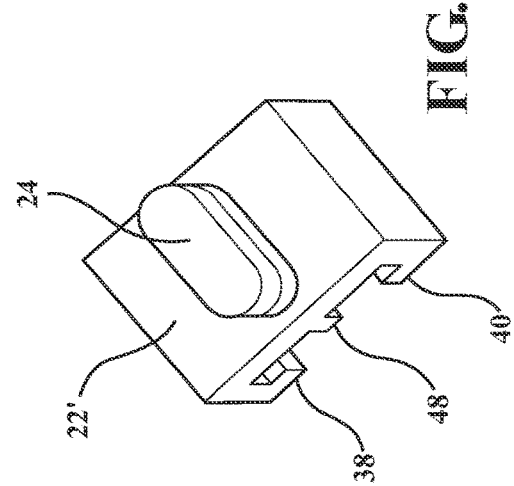
FIG. 7

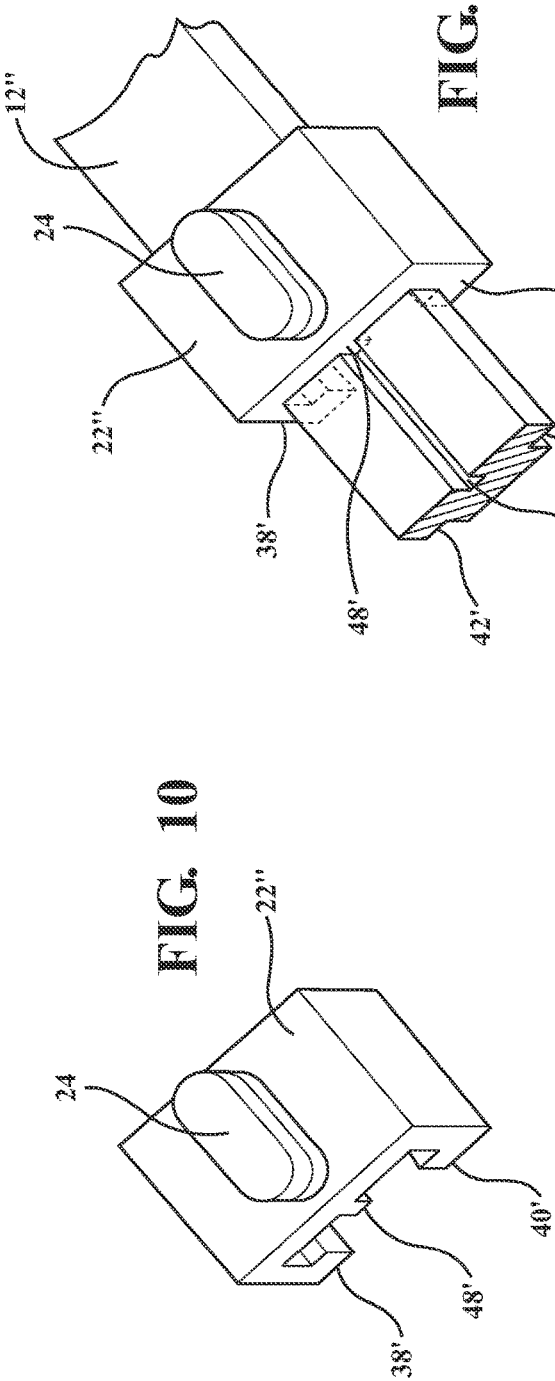
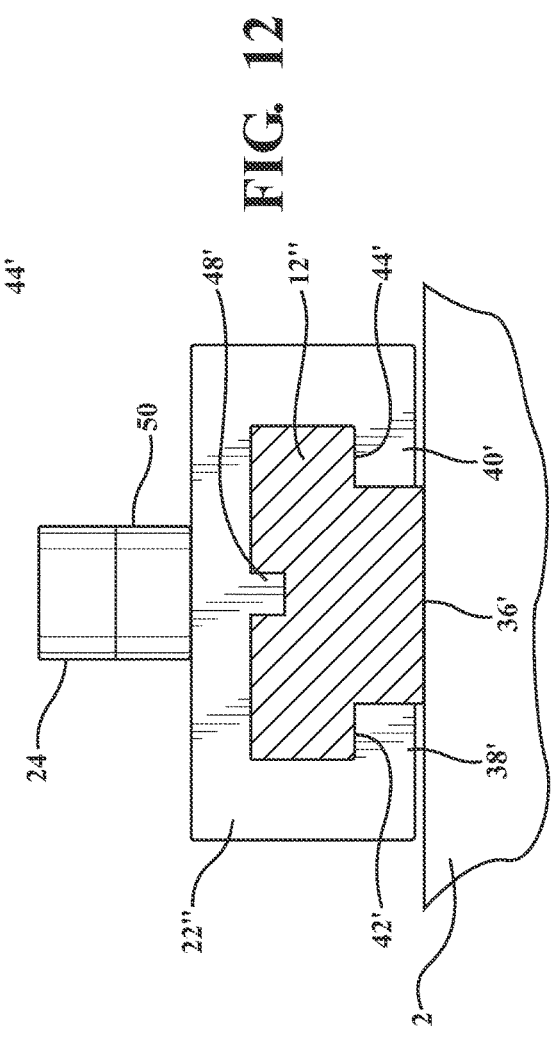

TRACK AND FASTENER ASSEMBLY, KIT AND METHOD FOR SECURING A FILTER SCREEN OR COVERING TO AN AIR INTAKE FACE

CROSS REFERENCE TO RELATED APPLICATIONS

The present application claims the priority of U.S. Ser. No. 63/178,075 filed Apr. 22, 2021.

FIELD OF THE INVENTION

The present invention relates generally to filtration assembly kits for covering an air intake face. More specifically, the present invention discloses a kit and assembly for securing any filter, screen or covering to a perimeter intake face surrounding an opening. The kit includes a series of mounting tracks with corner or T connectors for mounting flush against the intake face surrounding an opening. A plurality of fasteners install upon each of the tracks along opposite exterior side rail locations and are adjustable along the lengths of the tracks. The filter, screen or covering includes a plurality of perimeter spaced apertures, such as which can incorporate a reinforced edging containing any type of grommets for securing the screen or covering to each of the pre-positioned fasteners and in order to mount the covering to the intake face.

DESCRIPTION OF THE BACKGROUND ART

The prior art is documented with various examples of assemblies, kits and methods for assembling a filter, cover or the like over an air intake opening. As is further known, filter installations tend to exert increasing load (also identified as resistance to passage of airflow through the filter) resulting from the progressive aggregation of contaminates entrapped by the filter positioned over the air intake opening. In particular instances in which the filter edges are not secured flush to the intake face, this results in progressive intake/admittance of bypass air and contaminates around the edges of the filter.

Examples of existing filter screen assemblies are disclosed in each of Simmons U.S. Pat. Nos. 9,561,456, 9,827,521, 9,827,522, 10,040,149. In each of the above instances, the kit and assembly of Simmons disclose a fastening system for applying, over an opening and surrounding fascia of a structure, a covering material including either of a flexible or rigid outer reinforced extending perimeter, within which is configured a plurality of receiving apertures. A plurality of elongated rails are adapted to being secured to the fascia in extending fashion proximate the opening, with each of the rails exhibiting a three dimensional cross sectional shape with a forwardly projecting support surface within which is configured an outwardly facing narrowed slot.

A plurality of fasteners each include a planar shaped base installable through an accessible end location of each of the rails so as to be traversable along an interior channel defined in the rail. A further rotatable portion of each fastener projects from the insertable base through the outwardly facing slot and in order to be rotated from a first position aligning with and seating over perimeter defined receiving apertures of the covering material to a second position in order to affix the material.

Also disclosed is the Deltrian Pro Safe Screen which depicts a four-sided track, upon which are arranged a plurality of exterior adjustable fasteners or cars having rotatable twist lock portions for retaining edge locations of the screen. Of note, the adjustable fasteners slidably engage along underside locations of each of the interconnected tracks which are spaced upwardly from the intake surface, such that only the individual corner locations of each track section is directly mounted to the intake surface.

SUMMARY OF THE PRESENT INVENTION

The present invention seeks to provide an improved kit and assembly for securing any filter, screen or covering to a perimeter intake face surrounding an opening, and in which an arrangement of end-to-end interconnected tracks are adapted to mount flush against the intake face in surrounding fashion around the opening, thereby avoiding side admittance of particles or other contaminants from bypassing the filter or screen covering, and as the load exerted on the progressively contaminated filter screen applied over the intake opening reaches the point in which the intake airflow begins to bypass the screen around its outer perimeter edges. The invention includes a plurality of fasteners (such as without limitation any of twist lock or toggle lock fasteners) slidably installed over an exterior of each of the tracks prior to inter-assembly, and as opposed to being interiorly installed in prior art filter screen assemblies and in which their rotatable portions project upwardly through elongated slots formed in the tracks (this again shown in varying example in each of Simmons U.S. Pat. Nos. 9,561,456, 9,827,521, 9,827,522, 10,040,149).

The configuration of the tracks in the present design further include opposite side exterior rail locations which oppose tabs configured into interior facing locations of the fasteners so that the fasteners are adjusted along the opposite sides of the tracks, thereby permitting the underside of each track section to be flush mounted to the intake surface. The filter, screen or covering further includes a plurality of perimeter spaced apertures for securing to upward projecting and engaging portions of the fasteners, upon pre-positioning each of the fasteners and aligning locations along the tracks, this in order to mount the filter, screen or covering to the intake face in extending fashion over the intake opening.

Additional features include the rail locations in the tracks extending along opposite side edges. The tracks each further include a base surface flush mounting to the intake face. A linear recess notch is configured in a top of each of the track sections for seating a mating interior projection configured upon a roof underside of each of the fasteners.

A plurality of corner connectors are provided for interconnecting opposing ends of each of the tracks. The corner connectors each include an "L" shaped body having first and second receiving pockets, each of the track sections further including a rectangular extending tongue dimensioned to resistively fit within the receiving pockets configured into each of the corner connectors.

The filter, screen or covering further includes a reinforced location established around an outer edge perimeter and further including any of a ring or grommet for defining each of the perimeter spaced apertures. The engaging portion of each of the fasteners further include any of twist lock or toggle lock portions. A plurality of intermediate "T" shaped connectors are provided for interconnecting opposing intermediate ends of each of horizontal and vertical extending sections of the tracks.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a kit illustration depicting each of an attachable screen, plurality of elongated tracks for flush mounting against the intake face along with corner connectors, and fasteners exteriorly adjustable along opposite exterior side rails configured in the tracks;

FIG. 2 is an exploded view illustrating a frame construction including the track, corner connector and fasteners of FIG. 1 in arrayed fashion prior to assembling to the intake face;

FIG. 6B is a related exploded perspective to FIG. 6A according to a second non-limiting configuration of the surface mounting track with "T" shaped connectors and (similar to FIG. 5B), and again in which the tongue portions are relocated to extend from the "T" connector, with the recess instead formed within an entire interior extending length of the track section, such permitting the track to be sectioned (resized) to any reduced length during installation and resistively engaged to the given projecting tongue of the "T" connector;

FIG. 7 is a perspective view of an exteriorly length adjustable fastener according to a further non-limiting configuration;

FIG. 7A is a perspective view of an exteriorly length adjustable toggle style fastener according to a further non-limiting configuration;

FIG. 10 is a perspective view of an alternately configured exteriorly length adjustable fastener according to a further non-limiting configuration;

FIG. 11 is corresponds in presentation to FIG. 8 and depicts the fastener of FIG. 10 secured to an alternate cross sectional configuration of a surface mounting support track;

FIG. 12 is an end view of the fastener and track depicted in FIG. 11 and again depicting the surface mounting aspect of the alternately support track with side configured engagement rails, along which linearly adjusts the exterior supported fasteners;

DETAILED DESCRIPTION OF THE PREFERRED EMBODIMENTS

With reference to FIG. 1 of the attached drawings, the present invention discloses a kit and assembly for surface mounting a perimeter defining track flush against an intake face surrounding an intake opening. The present invention further seeks to overcome the deficiencies in the prior art, and by which the progressive fouling of an intake screen or filter covering (also termed as a load exerted on the filter) will cause a path of least resistance to, in response to such fouling, draw air through any gap existing between the intake surface surrounding the opening and the perimeter mounted track, thereby bypassing the screen.

As will be individually described in further detail, the kit includes each of an attachable screen, filter or other covering (in each instance depicted at 10). A plurality of elongated tracks are provided as shown at 12, 14, 16 and 18 for establishing a perimeter defining arrangement assembly and for flush mounting against the intake face via the use of any suitable fasteners including screws or adhesives.

Other kit components include corner connectors 20 (typically four) for engaging ends of the track sections to define a closed perimeter frame of the assembled track when secured upon the intake face. Finally, a plurality of fasteners 22 are provided and which, as will be further described, each include a lower car portions which slidably install over the ends of the individual track sections 12-18, prior to assembly of the corner connectors 20) and so that the fasteners are linearly adjustable along opposite exterior side rails configured in the tracks to aligning positions allowing for upward extending portions (such as without limitation twist or toggle lock portions) for engaging through perimeter defined grommets or the like for retaining the screen. Each of the track sections, corner connectors and exterior slide on fasteners are constructed of any suitable material not limited to metal or durable polymer. The screen or covering can further include any flexible material not limited to a mesh, fabric or the like.

FIG. 2 is an exploded view illustrating a rectangular frame construction dimensioned to cover an intake opening of an air handling unit (not shown) and once secured to the intake face. The frame includes both longer sections of track (again at 12 and 14) defining top and bottom of the frame, and shorter sections of track (again at 16 and 18) defining first and second sides. Without limitation, the track sections 12-18 can be mounted to the intake face of the equipment using any of screws, adhesives (such as peel and stick), or magnets. FIG. 2 also depicts the corner connector and fasteners of FIG. 1 in arrayed fashion prior to assembling to the intake face.

Figure 2A:
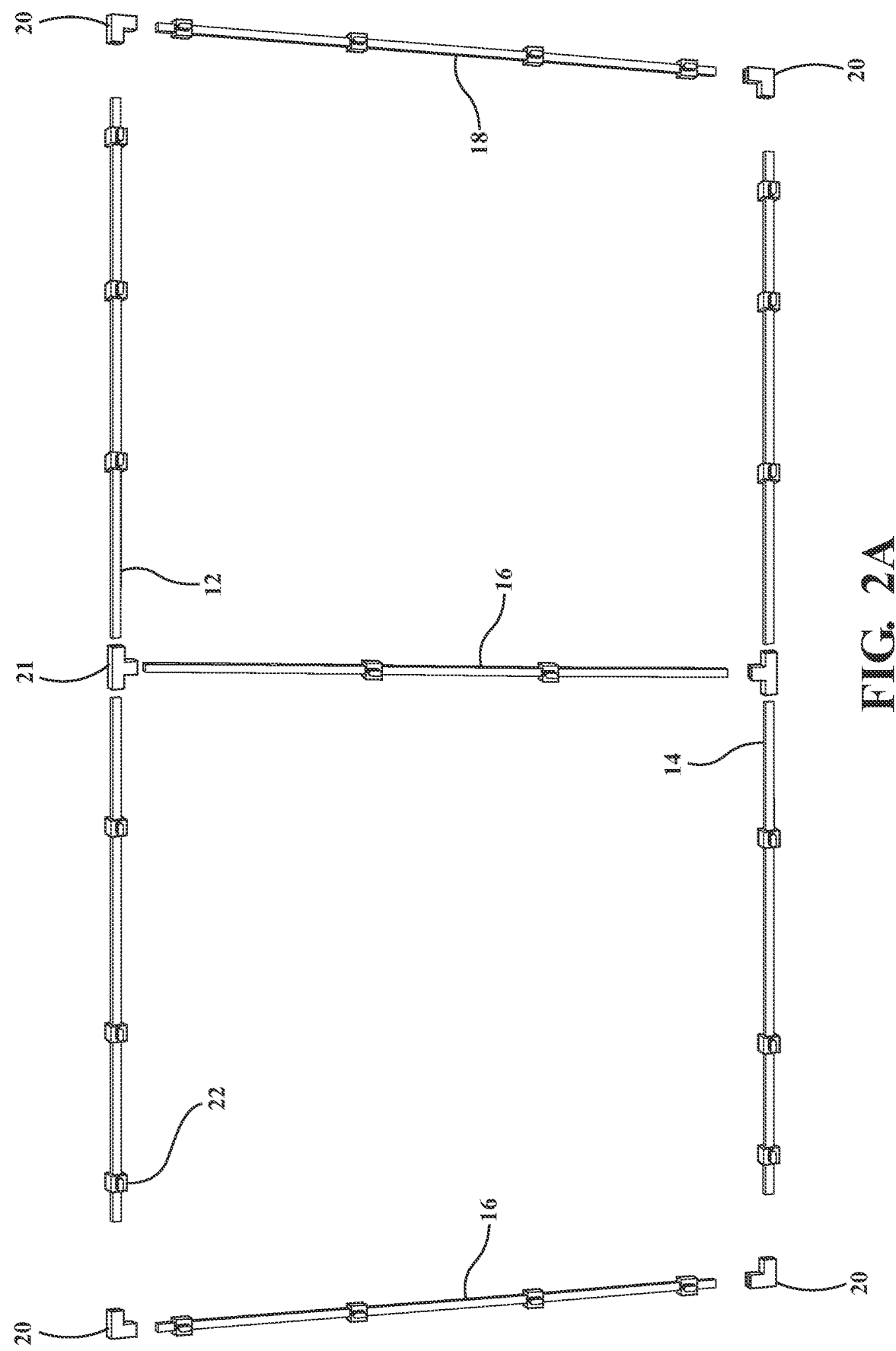
FIG. 2A is an alternated exploded view to FIG. 2 and depicting a variant of the kit incorporating intermediate "T" type connectors along with subdivided lengths of the upper and lower extending track sections along with an intermediate vertical extending track section for providing additional filter/covering support.

FIG. 2A is an alternated exploded view to FIG. 2 and depicting a variant of the kit incorporating intermediate "T" type connectors 21 positioned along with subdivided lengths of the upper 12 and lower 14 extending track sections, these along with an intermediate vertical extending track section 17 for providing additional filter/covering support. The "T" connectors 21 are otherwise similar in construction as the corner connectors 20 and provide additional intermediate interior support to the associated filter or covering 10.

Figure 3:
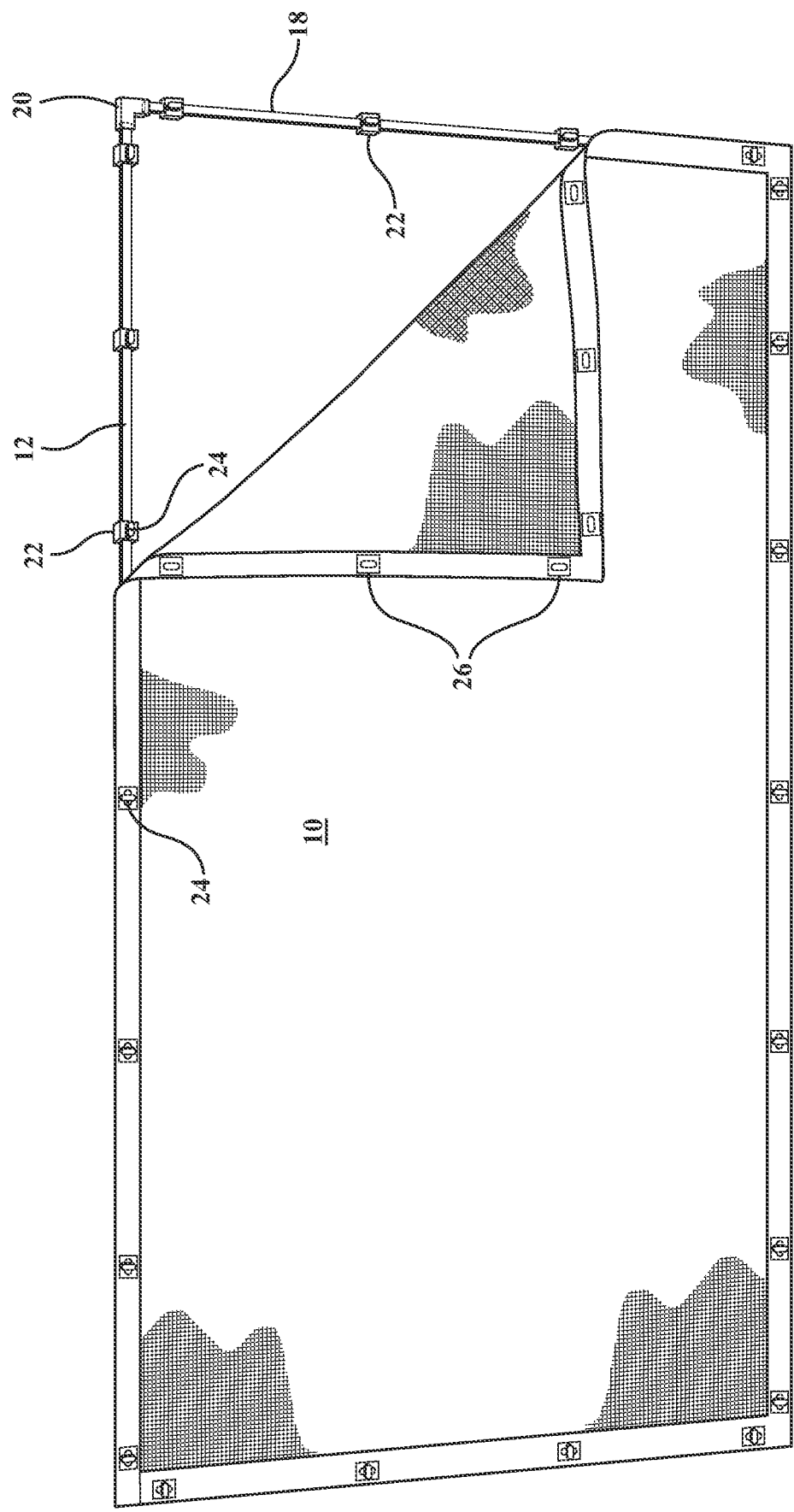
FIG. 3 depicts the screen in an intermediate attached configuration to the frame construction in FIG. 2.
Figure 4:
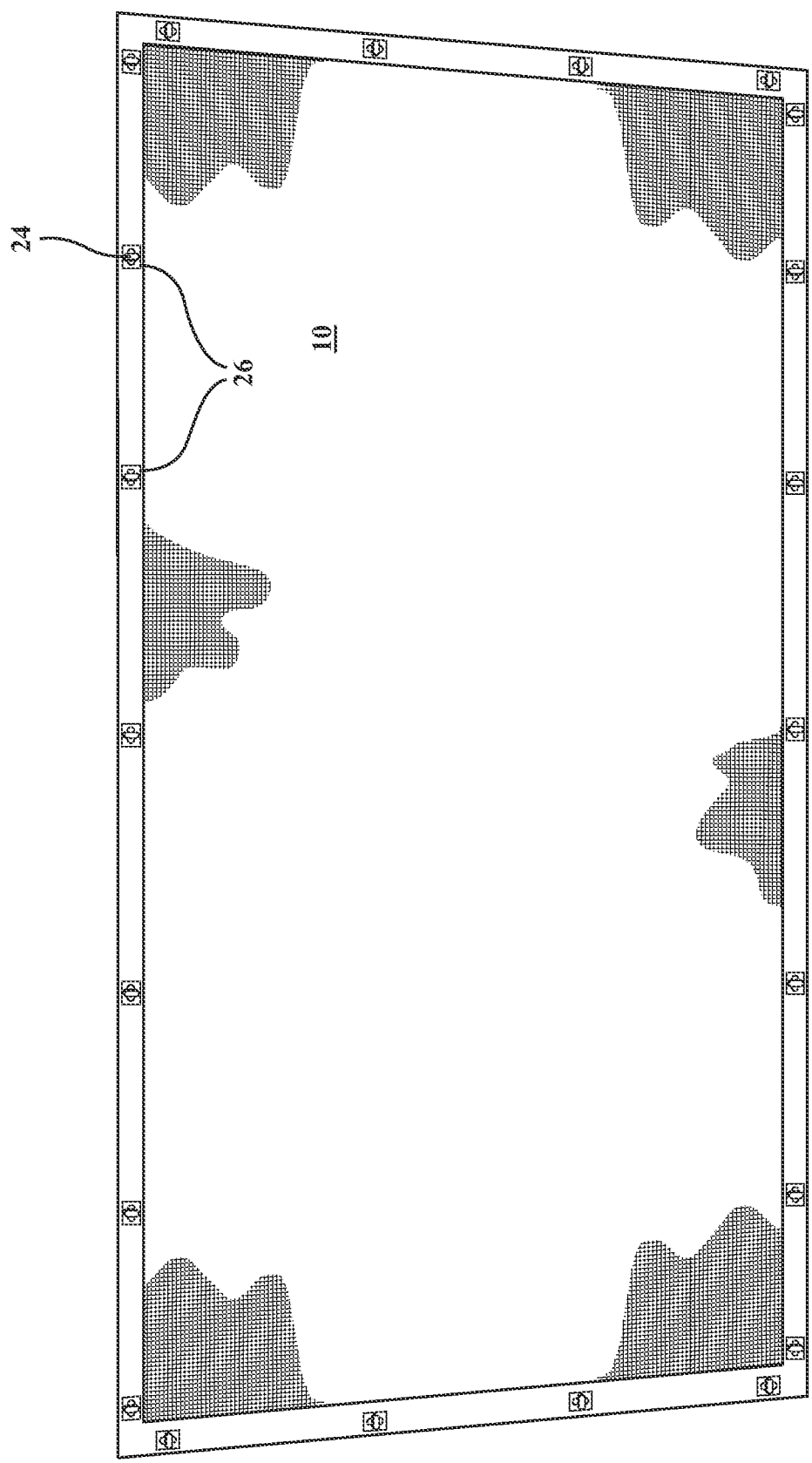
FIG. 4 is a succeeding illustration to FIG. 3 and depicting the screen completely attached to the frame construction.

FIG. 3 depicts the screen or covering 10 in an intermediate attached configuration to the frame construction in FIG. 2. In this depiction, the individual fasteners 22 are positioned so that projecting twist or toggle lock portions (see twist lock version depicted at 24 also in FIG. 7 et seq.) and which are inserted through any type reinforced location established around an outer edge perimeter of the cover or screen, these further defining any of a ring, grommet or the like (see at 26) at spaced apart locations around the outer perimeter of the covering 10. FIG. 4 is a succeeding illustration to FIG. 3 and depicting the screen completely attached to the frame construction. Beyond that shown, it is understood that the arrangement of the linearly adjustable fasteners 22 upon the track sections 12-18, as well as the configuration of the reinforcing edge defined rings or grommets 26, can be modified from that shown to accommodate any desired mounting arrangement and can include relocating at any point from the respective corner locations of the screen and frame.

Figure 5A:
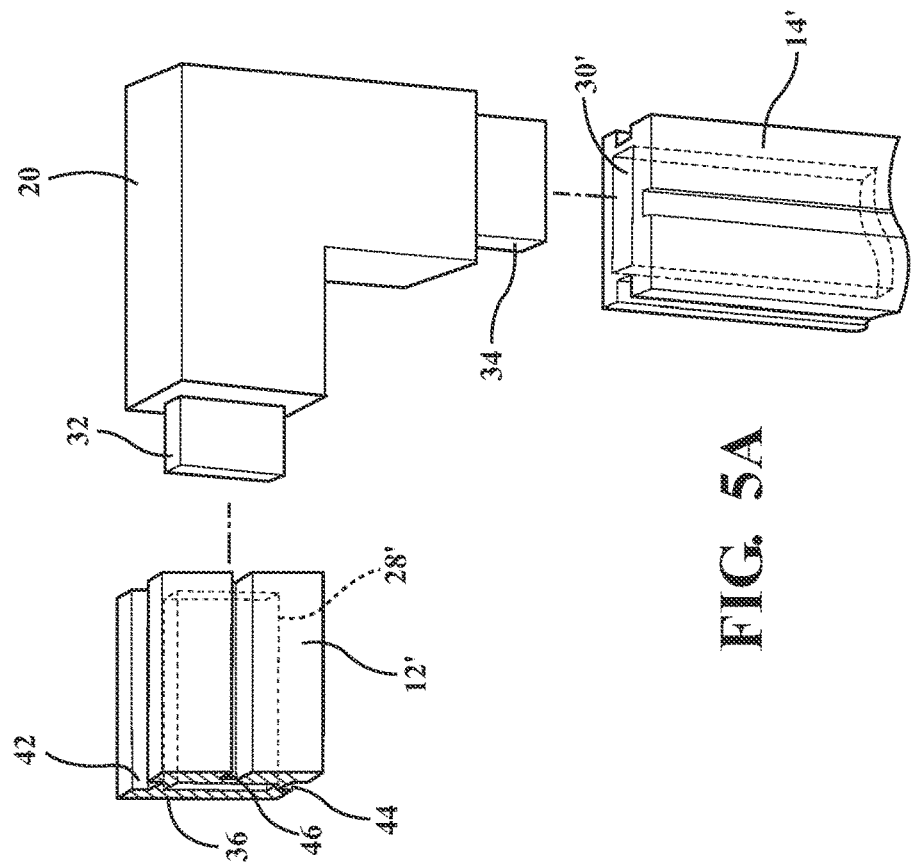
FIG. 5A is a related exploded perspective to FIG. 5 according to a second non-limiting configuration of the surface mounting track and corner connectors and in which the tongue portions are relocated to extend from the corner connector, with the recess instead formed within an entire interior extending length of the track section, such permitting the track to be sectioned (resized) to any reduced length during installation and resistively engaged to the given projecting tongue of the corner connector.
Figure 5:
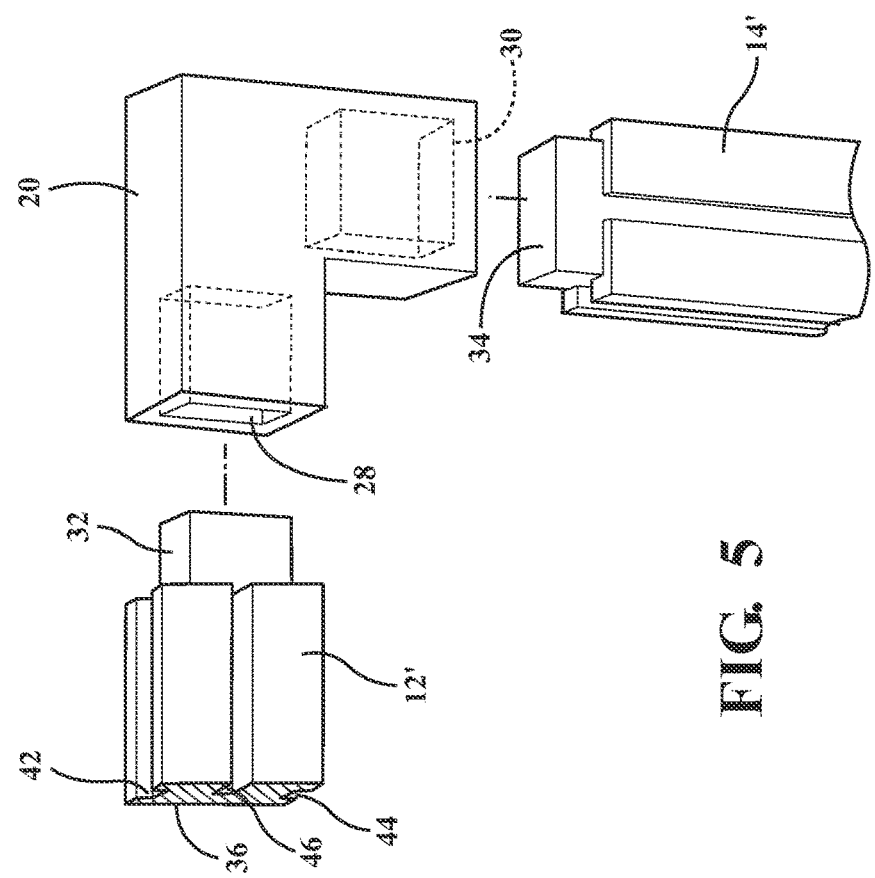
FIG. 5 is an exploded perspective of a first non-limiting configuration of surface mounting track and corner connectors according to the present invention for establishing a flush mount against the intake surface.

Proceeding to FIG. 5, an exploded perspective is shown of a first non-limiting configuration of surface mounting track and corner connectors according to an embodiment of the present invention for establishing a flush mount against the intake surface. The corner connectors area again as shown at 20 in FIGS. 1-4, with each including an "L" shaped body having first and second receiving pockets (see rectangular shaped pocket shaped profiles at 28 and 30 corresponding to first and second angled sides).

The flush mount track sections 12-18 can be shaped according to any modified cross sectional configuration and, as shown in FIG. 5, are depicted by corner connecting lengths of track sections at 12' and 18'. Each of the track sections includes a rectangular extending tongue or projection end portion (see tongue at 32 for reconfigured track shown at 12' and further by tongue 34 for reconfigured track 14'), and which are dimensioned to resistively fit within reciprocal mating the receiving pockets 28 and 30 configured into the corner connector. Alternatively, any of adhesives or mechanical fasteners can be employed for engaging the ends of the track sections into the corner connectors and the present invention further envisions a reciprocal arrangement by which the corner connectors can be redesigned to exhibit similar shaped projecting tongues for seating within mating recesses which can be designed into the ends of further redesigned track sections.

FIG. 5A is a related exploded perspective to FIG. 5 according to a second non-limiting configuration of the surface mounting track sections 12-18 and corner connectors 20, and in which the tongue portions 32 are relocated to extend instead from the corner connector 20. As further shown, the recess 28 originally shown as interior pockets in the corner connector 20 of FIG. 5 is shown in the variant of FIG. 5A at 28' (in comparison narrowed as compared to at 28) and formed within an entire interior extending length of the track section (again shown by example by interior recess 28' in track section 12' and corresponding interior recess 30' in track section 14', both of the track sections also shown in reduced length depiction). In this fashion, the individual sections of track (such as which are typically provided as eight foot lengths) can be sectioned (resized) by the installer according to any reduced length during installation upon a given piece of equipment and over an intake opening and in order to be resistively engaged to the given projecting tongue of the corner connector 20.

Figure 6:
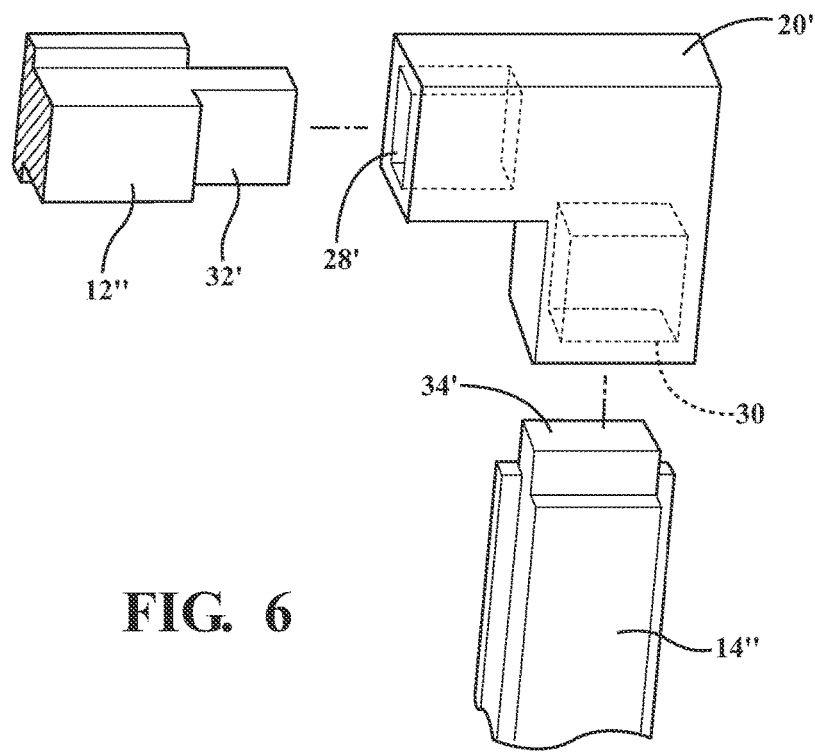
FIG. 6 is an exploded perspective of a second non-limiting configuration of surface mounting track and corner connectors according to the present invention for again establishing a flush mount against the intake surface.

FIG. 6 largely repeats much of the structure previously described and shown in FIG. 5 and by which the a modification 20' of the corner connectors each again include an "L" shaped body having first 28 and second 30 receiving pockets (see rectangular shaped pocket shaped profiles corresponding to first and second angled sides). Horizontal track section 12" includes an end-projecting tongue portion 32', with vertical track section 14" a corresponding end-projecting tongue portion 14" for resistively engaging within the corner connector recessed pockets 28 and 30.

Figure 6A:
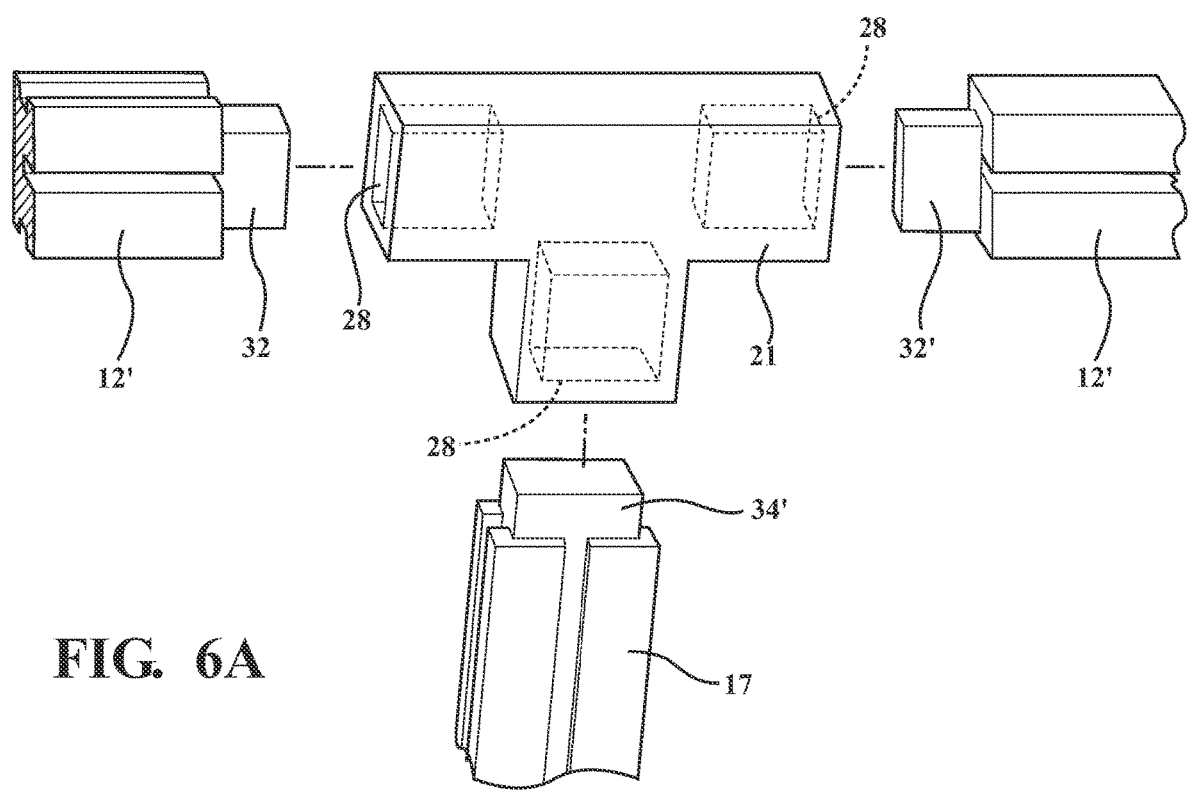
FIG. 6A is an exploded perspective illustration of a "T" shaped intermediate connector depicted in FIG. 2A according to a non-limiting configuration of surface mounting track and corner connectors according to the present invention for again establishing a flush mount against the intake surface.

FIG. 6A is an exploded perspective illustration of the "T" shaped intermediate connectors 21 depicted in FIG. 2A according to a non-limiting configuration of surface mounting track and corner connectors according to the present invention for again establishing a flush mount against the intake surface 2. In this illustration, a variant of the subdivided horizontal track sections are again shown at 12', along with a likewise reconfiguration of the intermediate vertical track, see as shown at 17, these corresponding to the cross sectional track sections 14' depicted in FIG. 5 and including a projecting tongue 34'.

The track sections are designed to exhibit a flat bottom surface (see as best shown at 36 as shown for track 12' in FIG. 5). Each of the track sections 12' and 14' further exhibit a cross sectional profile for slidably receiving the corresponding fasteners, which can be suitably reconfigured from the generic version depicted at 22 in FIG. 1 and, in the instance of the track sections 12' and 14', are depicted at 22 'in FIGS. 7-9.

The fasteners 22' each depict a slidable engaging profile which, in the perspective of FIG. 7, is shown by side located and inwardly angled tabs 38 and 40, these further being configured (upon being slidably installed over an end of the track section) to mate with outwardly side facing and opposing configured rails, these depicted as opposite exterior side facing and linear extending recess slots at 42 and 44. The slots 42/44 are configured within each track section (as further depicted by track section 12' in FIG. 8). Additional guiding support for the slidable attachable fasteners 22' can be provided by a linear recess notch (see at 46 configured in a top of each track section as shown at 12'), this seating a mating interior projection 48 configured upon a roof underside of the fastener 22'.

FIG. 6B is a related exploded perspective to FIG. 6A according to a second non-limiting configuration of the surface mounting track with "T" shaped connectors 21 and (similar to FIG. 5B), and again in which the tongue portions 32 are relocated to extend from each connecting interface of the "T" connector, with the recesses (again at 28' as depicted in FIG. 5A) instead being formed within an entire interior extending length of each track section, such permitting the track to again be sectioned (or resized) to any reduced length during installation and then resistively engaged to the given projecting tongue of the "T" connector.

FIG. 7A is a perspective view of an exteriorly and linearly adjustable toggle style fastener 23 according to a further non-limiting configuration. The toggle fastener is similar in construction and operation as the twist lock style fastener variants previously shown at 22 and 22' and includes a toggle element 25 rotatable about a horizontal axis (as opposed to the twist lock element which rotates about a vertical axis extending through the fastener). A pair of spaced apart and upwardly extending support plates 27 and 29 are affixed to the upper surface of the fastener 23 for supporting the rotation of the toggle element.

Figure 8:
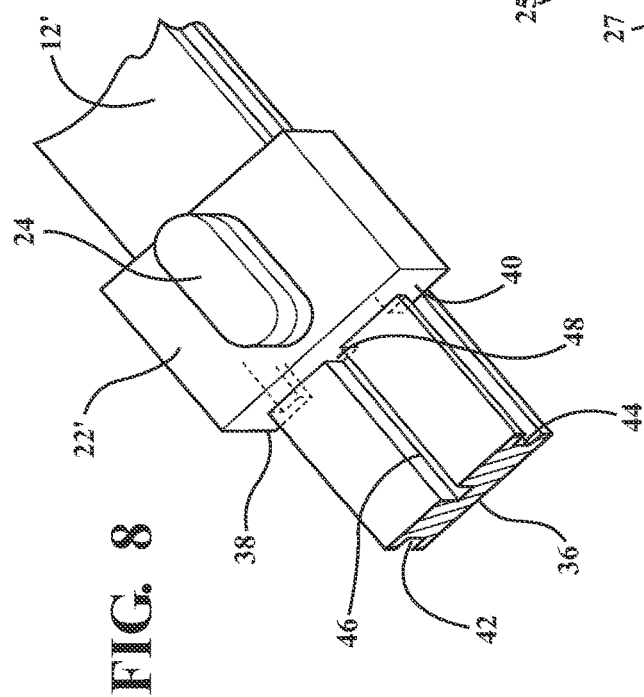
FIG. 8 is a succeeding illustration depicting the fastener of FIG. 7 mounted to an alternately configured intake surface mounted track.
Figure 9A:
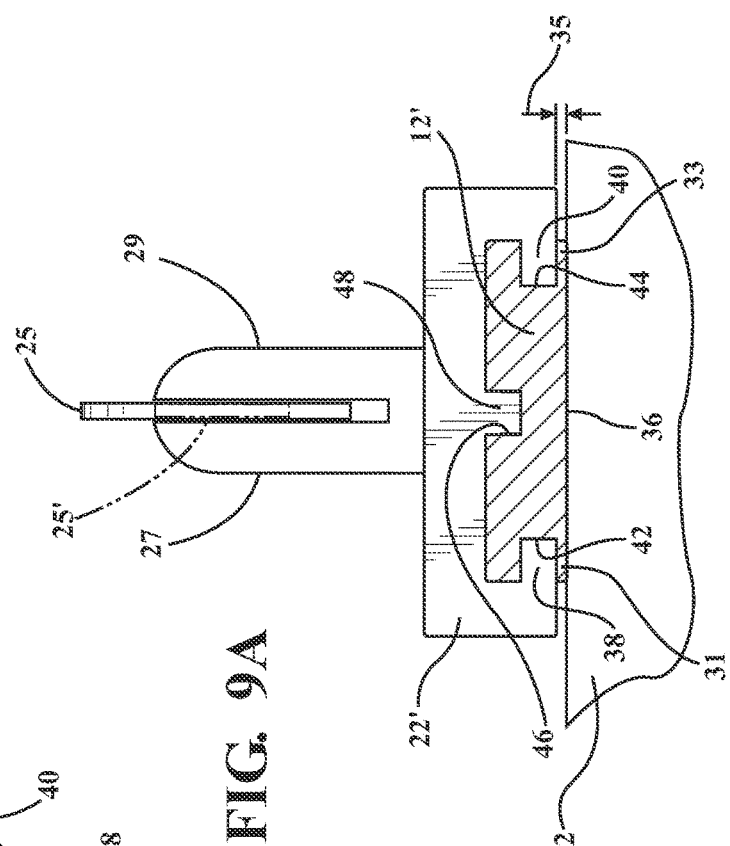
FIG. 9A is an alternate end view of the fastener and track shown in FIG. 9 and depicting a toggle style fastener in place of a twist lock fastener.
Figure 9:
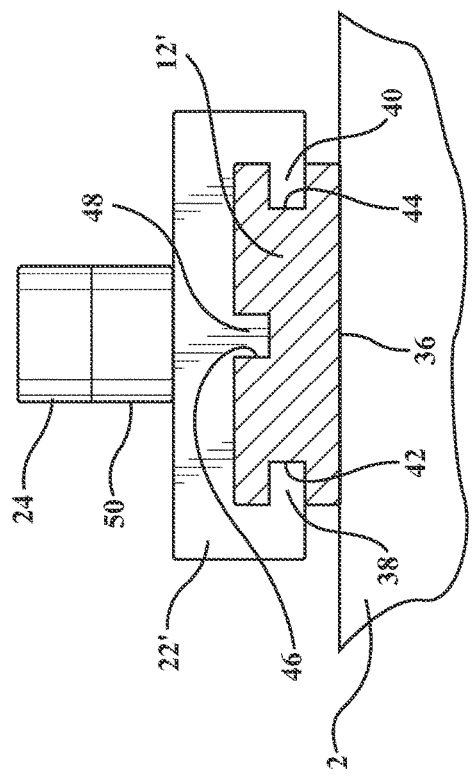
FIG. 9 is an end view of the fastener and track depicted in FIG. 8 and better depicting the surface mounting aspect of the support track with side configured engagement rails, along which linearly adjusts the exterior supported fasteners.

In this manner, and as best depicted in FIGS. 8-9, each of perspective and end views are provided of the fastener and track and better depicting the surface mounting aspect of the support track (this depicted in 9 again by underside surface 36 of track which can be secured to a surface 2 such as which can surround an intake opening of an air handling unit) with side configured engagement rails, along which adjusts the exterior supported fasteners 22' in a manner which does not interfere with the surface mount to the intake surface. In this manner, the track sections are flush mounted to the intake surface along their entire lengths, with this mounting aspect of the track not interfering with the ability to adjust the exterior supported fasteners along the individual tracks during installation of the given screen, filter or other covering 10.

It is also envisioned and understood that the fasteners 22, according to any of the disclosed variants herein, can be dimensioned relative to the supporting track sections, so as to be frictional-adjusted when linearly adjusts along the exterior of each of the track sections. Other locking mechanism (such as utilizing without limitation and of cams, screws or the like) can also be incorporated into the opposing interface established between each fastener and associated track section 12-18 for pre-adjusting the positioning of the fasteners before installation of the screen or covering.

Without limitation, the opposing seating configurations established between the fastener and track can be dimensioned so that a selected plurality of individual fasteners are initially installed in end fashion along each track section, prior to interconnection of the track sections with the end connectors. The fasteners are further dimensioned such that they linearly adjust along each of the inter-assembled sections of track, and which can again include either of a tight dimensioning between the track and fasteners for providing for a frictional/resisting linear adjustment without the need for separate connectors or anchors, as well as a looser dimensioning in which the fasteners can be more easily slid along the track sections and, upon being positioned at an aligning location for engaging the cover, can additionally again include a separate cam or screw (not shown) for tightening or locking the fastener in position along a given track section.

As again depicted in FIG. 9, the twist or toggle lock portions each again include an uppermost adjustable portion as again shown at 24, this being adjustable relative to a post or base portion 50 (see as best shown in FIG. 12). As indicated, alternate versions can include a toggle portion or other portion for engaging through the ring or grommet configured into the edge perimeter of the screen or covering. Although not shown, other variants contemplate redesigning the fasteners to incorporate any type of compressible or deflectable portion for engaging the ring or grommet location of the cover.

FIG. 9A is an alternate end view of the twist lock fastener and track shown in FIG. 9, and depicting the toggle style fastener 23 (as described in FIG. 7A) in place of the twist lock fastener). The cross sectional configuration shown in FIG. 9A also reconfigures the cross sectional profile 12' of the track section in FIG. 9 by narrowing the thickness of bottom wing sections (at 31/33) of the track, these seating the inwardly angled side tabs 38/40 of the fastener base 23 in a manner which more closely spaces the bottom edges of the fastener with the intake surface 2 (this depicted by a minimal spacing 35 (this can be decreased to zero between the fastener underside and the intake surface) depicted between the underside of the side tabs 38/40 and the opposing intake surface 2. With subsequent reference to FIG. 12, a similar close tolerance surface dimensioning is depicted between the underside of the traversable fasteners 22" and the intake face 2, it being understood that any amount of spacing or dimensioning can be designed into the construction of the surface mounted track sections and the exteriorly traversable fasteners.

Proceeding to FIG. 10, a perspective view is shown of an alternately configured exteriorly and linearly adjustable fastener 22" according to a further non-limiting configuration and which largely matches the construction of the fastener 22' in FIG. 7, with the exception of the dimensioning of the angled side tabs being reconfigured at 38' and 40' (see also FIG. 12) from that shown at 38/40 in the fastener variant 22' in FIG. 9. The track section is further redesigned, at 12" in FIGS. 11-12 from that shown at 12' in FIGS. 8-9 and so that the opposite side facing rails are reconfigured by underside recessed edges 42'/44' which replace the recessed side slots 42/44 in rail 12'.

The redesigned side tabs 38'/40' are dimensioned so that they seat against a narrowed cross sectional base portion (see in contact with the bottom track surface 36') of the selected track section 12" depicted in FIG. 12. As further again shown in FIG. 12, the surface mounting aspect to the intake 2 corresponds to that in FIG. 9 and by which the fasteners 12" can adjust along the individual interconnected sections of track without interference from the flush mount of the track bottom surface 36' to the intake face. Additional guiding support is again provided for the slidable attachable fasteners 22" provided by a linear recess notch (see at 46' configured in a top of each track section as shown at 12"), this seating a mating interior projection 48' configured upon a roof underside of the fastener 22" in each of FIGS. 10-12.

Figure 13:
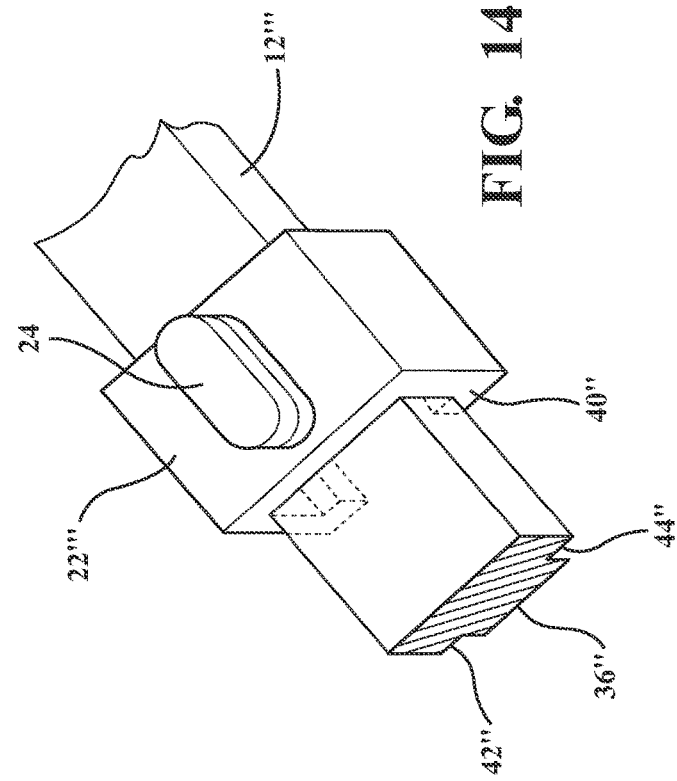
FIG. 13 is a perspective view of a further alternately configured exteriorly length adjustable fastener according to a further non-limiting configuration.
Figure 14:
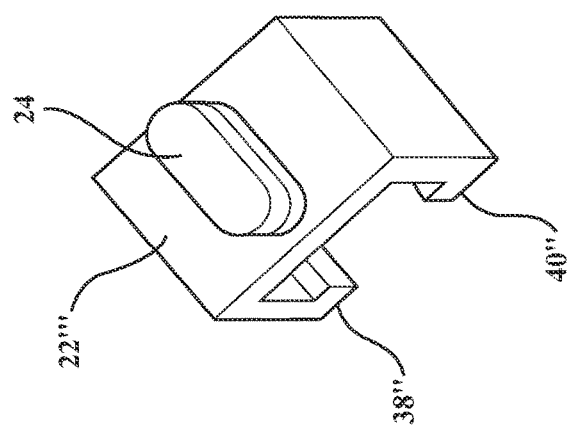
FIG. 14 is corresponds in presentation in each of FIGS. 8 and 11 and depicts the fastener of FIG. 13 secured to a further alternate cross sectional configuration of a surface mounting support track.
Figure 15:
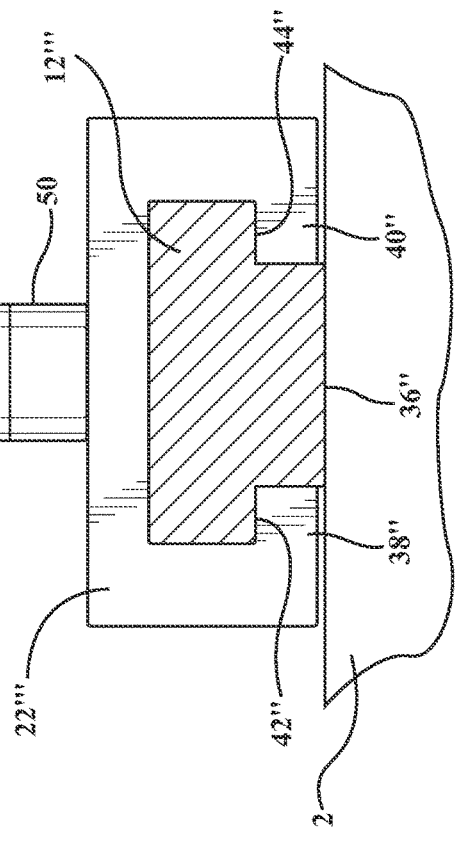
FIG. 15 is an end view of the fastener and track depicted in FIG. 14 and again depicting the surface mounting aspect of the alternately support track with side configured engagement rails, along which linearly adjusts the exterior supported fasteners.

FIG. 13 is a perspective view of a further alternately configured exteriorly adjustable fastener, see at 22''' in each of FIGS. 13-15 according to a further non-limiting configuration and which can represent either the same or another possible reconfiguration of the fasteners 22 generically represented in the kit views of FIGS. 1-4. The fasteners 22''' generally mimic those depicted at 22" and again include reconfigured angled sides 38"/40" which align with further redesigned underside rail ledges 42"/44" configured in the further redesigned version of the tracks (see selected track section by example at 12''').

As with the versions depicted in each of FIGS. 9 and 12, the sliding interface between the fasteners and tracks are such that the fasteners can be slidably attached over the ends of the redesigned tracks in a manner which permits them to be adjusted along the tracks (see FIG. 15) without interfering with the surface mounting (via base surface 36") of the tracks to the intake surface 2. Without limitation, the track sections can be designed to include any cross sectional profile adaptable for slidably receiving the fasteners in a fashion which does not interfere with the surface mounting of the tracks to the intake face. By this construction, the assembled depiction of the kit assembly in FIG. 4 prevents the side-admittance of debris or other contaminants underneath the inter-assembled track sections.

Having described my invention, other and additional preferred embodiments will become apparent to those skilled in the art to which it pertains, and without deviating from the scope of the appended claims. This can, in certain applications, include the redesigning of both the tracks and fasteners to exhibit other and varying configurations which are envisioned to cover both surface mount and, in given instances, non-surface mounting variants. Other variants envision incorporating corner connections directly into the track sections in order to further reduce part count and simplify assembly.

The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A kit assembly for securing a covering to a perimeter intake face surrounding an opening, comprising:
   a series of end-to-end assembled tracks adapted to be flush mounted to a surface surrounding an intake opening;
   a plurality of fasteners slidably installed upon each of said tracks prior to inter-assembly, said tracks each further incorporating opposite exterior side facing and linear extending recess slots which seat inwardly angled tabs configured into interior and opposing side facing locations of said fasteners so that said fasteners are adjustable along said tracks;
   said tracks contacting the surface below said linear extending recess slots along their extending lengths surrounding the intake opening to prevent bypass admittance of air not passing through the covering;
   said fasteners each further including an upper projecting portion; and
   the covering including a plurality of perimeter spaced apertures through which are received said upper projection portions for securing the cover over the opening and to the intake face.

2. The kit assembly of claim 1, further comprising a linear recess notch configured in a top of each of said track sections seating a mating interior projection configured upon a roof underside of each of said fasteners.

3. The kit assembly of claim 1, further comprising a plurality of corner connectors for interconnecting opposing ends of each of said tracks.

4. The kit assembly of claim 3, said corner connectors each including an "L" shaped body having first and second receiving recesses, each of said track sections including a rectangular extending tongue dimensioned to resistively fit within said receiving pockets configured into said corner connector.

5. The kit assembly of claim 3, said corner connectors each including an "L" shaped body having first and second end projecting tongues, each of said track sections including an internal and length extending recess dimensioned to resistively engage said tongues of said corner connector.

6. The kit assembly of claim 1, the covering further comprising any of a filter or screen further including reinforced locations established around an outer edge perimeter and further including any of a ring or grommet for defining each of the perimeter spaced apertures.

7. The kit assembly of claim 1, said engaging portion of each of said fasteners further comprising any of twist lock or toggle lock portions.

8. The kit assembly of claim 1, further comprising a plurality of intermediate "T" shaped connectors for interconnecting opposing intermediate ends of each of horizontal and vertical extending sections of said tracks.

9. The kit assembly of claim 8, said connectors each including a "T" shaped body having first, second and third receiving recesses, each of said track sections including a rectangular extending tongue dimensioned to resistively fit within said receiving pockets configured into said "T" connector.

10. The kit assembly of claim 8, said corner connectors each including an "T" shaped body having first, second and third projecting tongues, each of said track sections including an internal and length extending recess dimensioned to resistively engage said tongues of said corner connector.

11. A kit assembly for securing a covering to a perimeter intake face surrounding an opening, comprising:
 a series of end-to-end assembled tracks, said tracks each including a base portion adapted to be flush mounted to a surface surrounding an intake opening, each of said tracks exhibiting an internal and length extending recess between first and second ends;
 a plurality of fasteners slidably installed upon each of said tracks prior to inter-assembly, said tracks each further incorporating opposite exterior side facing and linear extending recess slots which seat inwardly angled tabs configured into interior and opposing side facing locations of said fasteners so that said fasteners are adjustable along said tracks;
 said tracks contacting the surface below said linear extending recess slots along their extending lengths surrounding the intake opening to prevent bypass admittance of air not passing through the covering;
 said fasteners each further including an upper projecting portion;
 a plurality of corner connectors for interconnecting opposing ends of each of said tracks, said corner connectors having first and second projecting tongue portions which engage any resized lengths of said tracks by resistively fitting within said recesses formed within said tracks; and
 the covering including a plurality of perimeter spaced apertures through which are received said upper projection portions for securing the cover over the opening and to the intake face.

12. The kit assembly of claim 11, further comprising a linear recess notch configured in a top of each of said track sections seating a mating interior projection configured upon a roof underside of each of said fasteners.

13. The kit assembly of claim 11, the covering further comprising any of a filter or screen further including reinforced locations established around an outer edge perimeter and further including any of a ring or grommet for defining each of the perimeter spaced apertures.

14. The kit assembly of claim 11, said engaging portion of each of said fasteners further comprising any of twist lock or toggle lock portions.

15. The kit assembly of claim 11, further comprising a plurality of intermediate "T" shaped connectors for interconnecting opposing intermediate ends of each of horizontal and vertical extending sections of said tracks.

16. The kit assembly of claim 15, said intermediate "T" connectors each further comprising first, second and third projecting tongues, resistively engaging opposing ends of said track sections.

17. A kit assembly for securing a covering to a perimeter intake face surrounding an opening, comprising:
 a series of end-to-end assembled tracks, said tracks each including a base portion adapted to be flush mounted to a surface surrounding an intake opening, each of said tracks exhibiting an internal and length extending recess between first and second ends;
 a plurality of fasteners slidably installed upon each of said tracks prior to inter-assembly, said tracks each further incorporating opposite exterior side facing and linear extending recess slots which seat inwardly angled tabs configured into interior and opposing side facing locations of said fasteners so that said fasteners are adjustable along said tracks, said fasteners each further including an upper projecting and engaging portion including any of twist lock or toggle lock portions;
 said tracks contacting the surface below said linear extending recess slots along their extending lengths surrounding the intake opening to prevent bypass admittance of air not passing through the covering;
 a plurality of corner connectors for interconnecting opposing ends of each of said tracks, said corner connectors having first and second projecting tongue portions which engage any resized lengths of said tracks by resistively fitting within said recesses formed within said tracks;
 a plurality of intermediate "T" shaped connectors for interconnecting opposing intermediate ends of each of horizontal and vertical extending sections of said tracks, said "T" connectors having first, second and third projecting tongues, resistively engaging opposing ends of said track sections;
 and the covering including a plurality of perimeter spaced apertures through which are received said upper projection portions for securing the cover over the opening and to the intake face.

18. The kit assembly of claim 17, further comprising a linear recess notch configured in a top of each of said track sections seating a mating interior projection configured upon a roof underside of each of said fasteners.

19. The kit assembly of claim 17, the covering further comprising any of a filter or screen further including reinforced locations established around an outer edge perimeter and further including any of a ring or grommet for defining each of the perimeter spaced apertures.

\* \* \* \* \*